US012482511B2

(12) United States Patent
He et al.

(10) Patent No.: US 12,482,511 B2
(45) Date of Patent: Nov. 25, 2025

(54) TECHNIQUES FOR MEMORY CELL RESET USING DUMMY WORD LINES

(71) Applicant: Micron Technology, Inc., Boise, ID (US)

(72) Inventors: Yuan He, Boise, ID (US); Wenlun Zhang, Tokyo (JP)

(73) Assignee: Micron Technology, Inc., Boise, ID (US)

( * ) Notice: Subject to any disclaimer, the term of this patent is extended or adjusted under 35 U.S.C. 154(b) by 280 days.

(21) Appl. No.: 18/310,715

(22) Filed: May 2, 2023

(65) Prior Publication Data
US 2023/0395123 A1 Dec. 7, 2023

Related U.S. Application Data

(60) Provisional application No. 63/347,838, filed on Jun. 1, 2022.

(51) Int. Cl.
G11C 11/4072 (2006.01)
G11C 11/408 (2006.01)
G11C 11/4091 (2006.01)
G11C 11/4096 (2006.01)

(52) U.S. Cl.
CPC ...... G11C 11/4072 (2013.01); G11C 11/4085 (2013.01); G11C 11/4091 (2013.01); G11C 11/4096 (2013.01)

(58) Field of Classification Search
CPC .................. G11C 13/0069; G11C 2213/74
USPC .................................................. 365/148, 149
See application file for complete search history.

(56) References Cited

U.S. PATENT DOCUMENTS

2012/0075910 A1* 3/2012 Yasuda ............. G11C 13/0004
365/148
2014/0092665 A1* 4/2014 Ueda .................. G11C 13/0028
365/63
2021/0090665 A1* 3/2021 Funatsuki .......... G11C 16/0483

* cited by examiner

Primary Examiner — Amir Zarabian
Assistant Examiner — Anthony Thinh Tang
(74) Attorney, Agent, or Firm — Holland & Hart LLP

(57) ABSTRACT

Methods, systems, and devices for techniques for memory cell reset using dummy word lines are described. A memory device may activate, as part of a reset operation, one or more dummy word lines to couple a voltage node with a bit line to supply the bit line with a reset voltage supplied to the voltage node. The memory device may then activate one or more word lines to couple the bit line with one or more memory cells to supply the one or more memory cells with the reset voltage such that the one or more memory cells are reset. In some cases, the memory device may disable one or more components of a sense amplifier coupled with the bit line during the reset operation to support the voltage node supplying the bit line with the reset voltage.

19 Claims, 8 Drawing Sheets

TECHNIQUES FOR MEMORY CELL RESET USING DUMMY WORD LINES

CROSS REFERENCE

The present application for patent claims the benefit of U.S. Provisional Patent Application No. 63/347,838 by He et al., entitled "TECHNIQUES FOR MEMORY CELL RESET USING DUMMY WORD LINES," filed Jun. 1, 2022, assigned to the assignee hereof, and expressly incorporated by reference herein.

FIELD OF TECHNOLOGY

The following relates to one or more systems for memory, including techniques for memory cell reset using dummy word lines.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
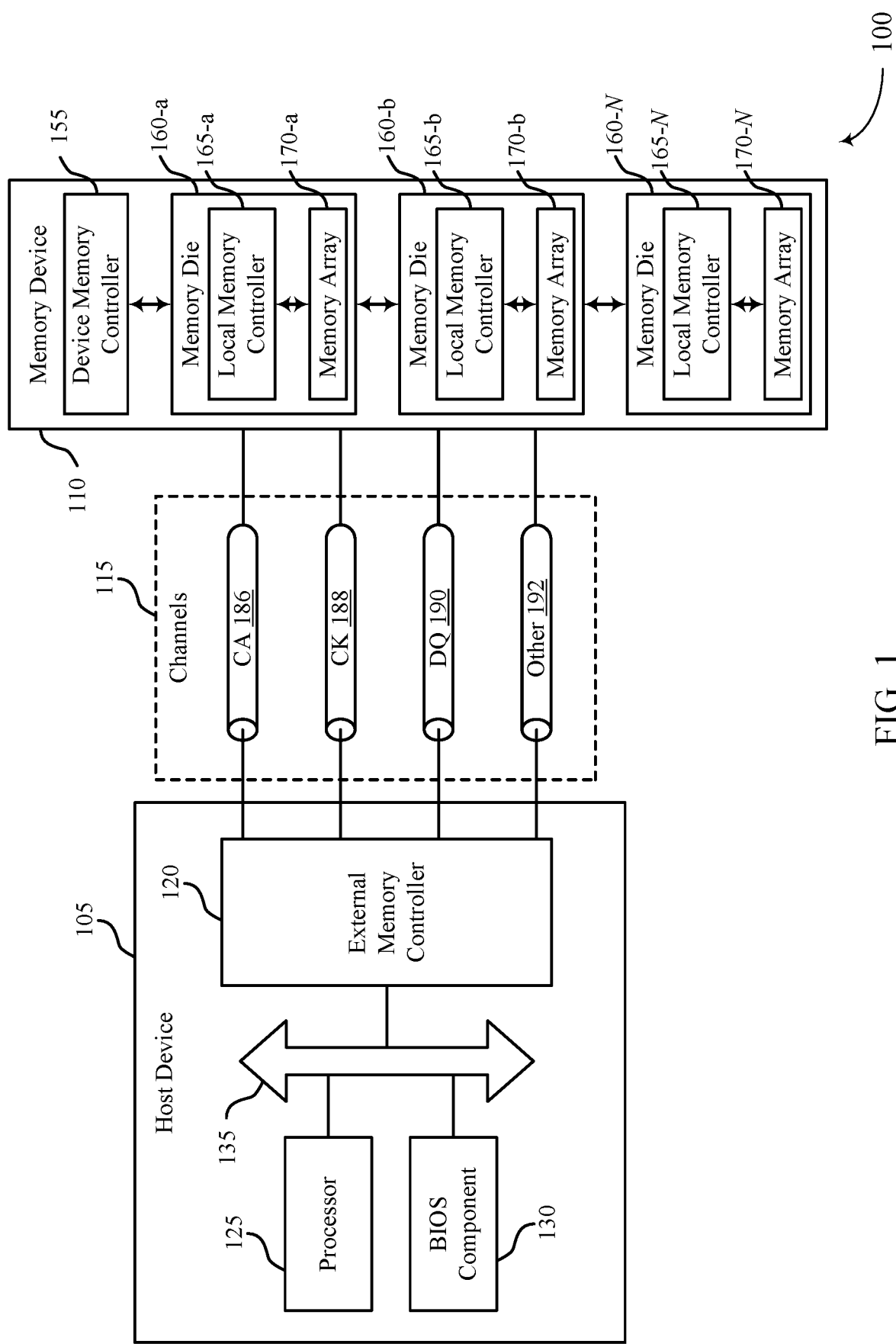
FIG. 1 illustrates an example of a system that supports techniques for memory cell reset using dummy word lines in accordance with examples as disclosed herein.

A memory device may support various operations, such as storing data at memory cells of the memory device, retrieving the stored data, or refreshing the stored data, among other examples. In some cases, the memory device may be vulnerable to row hammer attacks in which frequent activation of a same row of memory cells (e.g., of a same word line) may cause the row to interact with (e.g., leak charge to) nearby rows of memory cells, which may change the contents of the memory cells of the nearby rows. The memory device may mitigate these effects by performing various operations (e.g., row hammer refresh operations), which may involve counting accesses to a row of memory cells (e.g., counting word line activations) and storing such count information, for example, in a subset of memory cells of the memory device. The memory device may use the count information, for example, to determine when to perform refresh operations, such as targeted row refresh operations, to prevent row hammer attacks from successfully modifying or corrupting data.

In some cases, resetting at least the subset of memory cells used to store count information may ensure that proper and accurate row access counting is supported. For example, one or more of the subset of memory cells may maintain a previously stored logic state after a power down and powerup sequence of the memory device. As such, if the subset of memory cells are not reset, row access count information may be incorrect which may result in unnecessary or inaccurate refresh operation performance. Further, such unnecessary or inaccurate refresh operation performance may result in increased power consumption, increased latency (e.g., of other operations waiting for the refresh operations to be completed), and reduced row hammer attack mitigation.

In accordance with examples described herein, a memory device may perform a reset operation on memory cells using one or more dummy word lines. For example, the memory device may include word lines that may couple a bit line of the memory device to memory cells during an access operation. The memory device may also include dummy word lines, which may instead couple the bit line to a voltage node, for example, during reset operations. The memory device may activate, as part of a reset operation, one or more dummy word lines to couple a voltage node with a bit line to supply the bit line with a reset voltage supplied to the voltage node. The memory device may then activate one or more word lines to couple the bit line with one or more memory cells to supply the one or more memory cells with the reset voltage such that the one or more memory cells are reset. In some cases, the memory device may disable one or more components of a sense amplifier coupled with the bit line during the reset operation to support the voltage node supplying the bit line with the reset voltage. For example, disabling the one or more components of the sense amplifier may isolate the bit line from the sense amplifier such that the bit line is biased to the reset voltage supplied via the voltage node. By using dummy word lines in the resetting of memory cells, power consumption associated with sense amplifier operation may be reduced, reset operation complexity and latency may be reduced (e.g., relative to using a sense amplifier to perform the reset operation), and the reliability and accuracy of reset operations and row hammer refresh operations may be increased, among other advantages.

Features of the disclosure are initially described in the context of systems and dies as described with reference to FIGS. 1 and 2. Features of the disclosure are described in the context of memory devices, a sense amplifier, and waveform diagrams as described with reference to FIGS. 3 through 6. These and other features of the disclosure are further illustrated by and described with reference to an apparatus diagram and flowcharts that relate to techniques for memory cell reset using dummy word lines as described with reference to FIGS. 7 and 8.

FIG. 1 illustrates an example of a system 100 that supports techniques for memory cell reset using dummy word lines in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110). Although the system 100 depicts a DRAM system, the techniques described herein may be applicable to other memory systems.

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

The device memory controller 155 may include components (e.g., circuitry, logic) operable to control operation of the memory device 110. The device memory controller 155 may include hardware, firmware, or instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In accordance with examples described herein, the memory device 110 (e.g., a memory die 160 of the memory device 110) may contain one or more dummy word lines for performing a reset operation of memory cells of a memory array 170. For example, a dummy word line may be coupled with a control gate of a first transistor that is coupled between a bit line and a voltage node (e.g., rather than a memory cell). Activating (e.g., firing) the dummy word line (e.g., by a local memory controller 165) as part of a reset operation may couple the bit line with the voltage node such that a reset voltage supplied to the voltage node may be supplied to the bit line through the first transistor. As a result, subsequent activation (e.g., by the local memory controller 165) of a word line coupled with a control gate of a second transistor that is coupled between the bit line and a memory cell may supply the reset voltage to the memory cell such that the memory cell is reset.

In some examples, the memory device 110 may disable one or more components of a sense amplifier of the memory die 160 that is coupled with the bit line during the reset operation to support the voltage node supplying the bit line with the reset voltage. For example, disabling the one or more components of the sense amplifier may isolate the bit line from the sense amplifier such that the bit line is biased to the reset voltage supplied to the voltage node.

Figure 2:
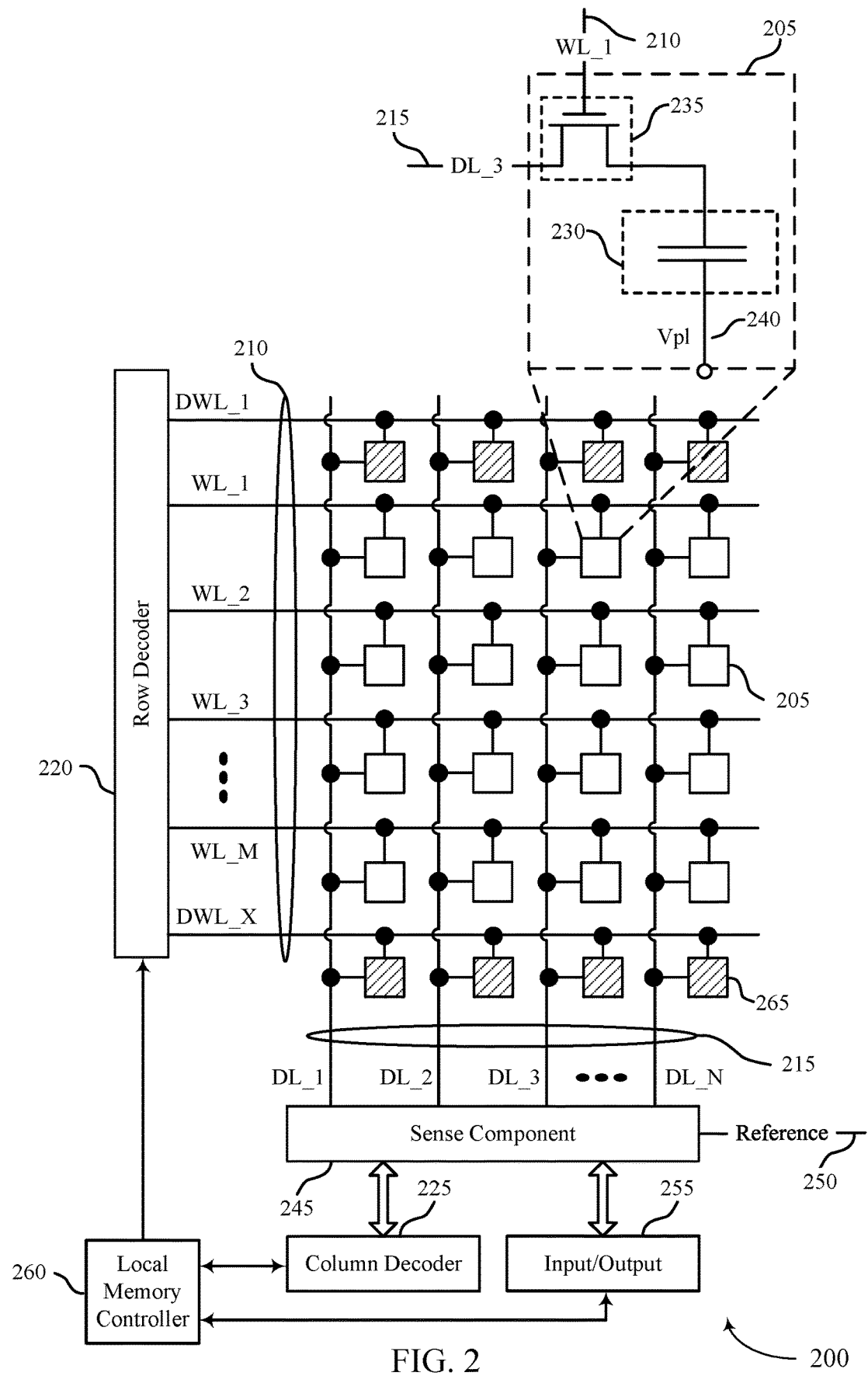
FIG. 2 illustrates an example of a memory die that supports techniques for memory cell reset using dummy word lines in accordance with examples as disclosed herein.

FIG. 2 illustrates an example of a memory die 200 that supports techniques for memory cell reset using dummy word lines in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1. Although the memory die 200 may depicts a DRAM system implementation, the techniques described herein may be applicable to other memory systems.

In some examples, a memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. In some examples, the memory cell 205 may include a logic storage component, such as capacitor 230, and a switching component 235 (e.g., a cell selection component). In some examples, the memory cell 205 may be the capacitor 230 and the switching component 235 may be considered external to the memory cell 205. The capacitor 230 may be an example of a dielectric capacitor or a ferroelectric capacitor. A node of the capacitor 230 may be coupled with a voltage node 240, which may be the cell plate reference voltage, such as Vpl, or may be ground, such as Vss.

The memory die 200 may include access lines (e.g., word lines 210, digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding. Memory cells 205 may be positioned at intersections of the word lines 210 and the digit lines 215.

Operations such as reading and writing may be performed on the memory cells 205 by activating access lines such as a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in a two-dimensional or in a three-dimensional configuration may be referred to as an address of a memory cell 205. Activating a word line 210 or a digit line 215 may include applying a voltage to the respective line.

Accessing the memory cells 205 may be controlled through a row decoder 220, or a column decoder 225, or any combination thereof. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

A word line 210 may be a conductive line in electronic communication with a memory cell 205 that is used to perform access operations on the memory cell 205. In some architectures, the word line 210 may be coupled with a gate of a switching component 235 of a memory cell 205 and may be operable to control the switching component 235 of the memory cell. In some architectures, the word line 210 may be coupled with a node of the capacitor 230 of the memory cell 205 and the memory cell 205 may not include a switching component 235.

In some cases, the word line 210 may be an example of a dummy word line and be coupled with a voltage node (e.g., a voltage node 345 as described with reference to FIG. 3). In some examples, dummy word lines may be one or more word lines 210 at the edges of the memory die 200. The dummy word lines may be coupled with one or more components 265. In some cases, a component 265 may be identical to a memory cell 205 but may be inoperable to perform access operations. For example, a switching component 235 included in a component 265 may couple a digit line 215 with a voltage node rather than a capacitor 230 (e.g., short the digit line 215 to the voltage node). As a result, the capacitor 230 that may be included in the component 265 may be inoperable to store a state, as the capacitor 230 may not be operatively coupled with the digit line 215.

A digit line 215 may be a conductive line that couples the memory cell 205 with a sense component 245. In some architectures, the memory cell 205 may be selectively coupled with the digit line 215 during portions of an access operation. For example, the word line 210 and the switching component 235 of the memory cell 205 may be operable to couple or isolate the capacitor 230 of the memory cell 205 and the digit line 215. In some architectures, the memory cell 205 may be coupled with the digit line 215.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device (e.g., a memory device 110) that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host (e.g., a host device 105) based on performing the one or more operations. The local memory controller 260 may generate row signals and column address signals to activate the target word line 210 and the target digit line 215. The local memory controller 260 also may generate and control various signals (e.g., voltages, currents) used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

The memory die 200 may be operable (e.g., using the local memory controller 260) to perform reset operations on one or more memory cells 205 using one or more of the dummy word lines 210. For example, the local memory controller 260 may activate (e.g., cause the row decoder 220 to activate) a dummy word line 210 to couple (e.g., through a switching component 235) a digit line 215 with a voltage node. The voltage node may be supplied with a reset voltage (e.g., a ground voltage) such that the digit line 215 may be biased to the reset voltage through the switching component 235. The local memory controller 260 may then activate one or more word lines 210 to couple the digit line 215 with the one or more memory cells 205 (e.g., to respective capacitors 230 through respective switching components 235). The reset voltage may be supplied to the one or more memory cells 205 via the digit line 215 such that the one or more memory cells 205 are reset.

In some cases, the memory die 200 may disable one or more components of the sense component 245 during the reset operation to support the voltage node supplying the digit line 215 with the reset voltage. For example, disabling the one or more components of the sense amplifier may isolate the digit line 215 from the sense component 245 such that the digit line 215 is biased to the reset voltage supplied to the voltage node. In some cases, however, such as when one or more dummy word lines 210 are defective, the local memory controller 260 may enable one or more components of the sense component 245 to short (e.g., couple) the digit line 215 to a digit line 215 of another memory array that includes functional dummy word lines 210. In some examples, the memory die 200 may be additionally operable (e.g., using the local memory controller 260) to perform precharge operations on one or more memory cells 205 using the one or more dummy word lines 210 by setting the voltage node to a precharge voltage. In some examples, the dummy word lines 210 may be maintained at an inactive level (e.g., a ground or low voltage) during read or write operations.

Figure 3:
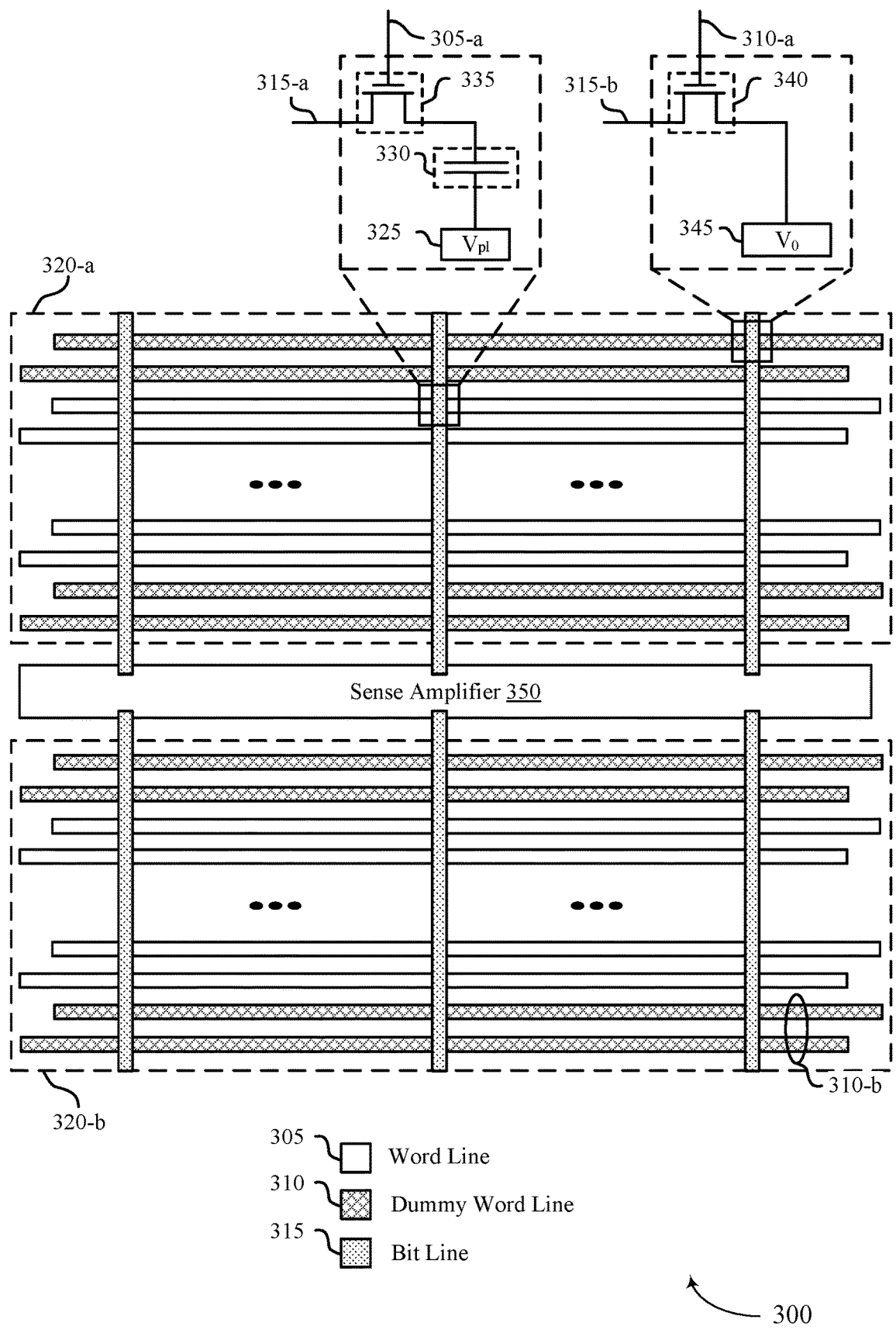
FIG. 3 illustrates an example of a memory device that supports techniques for memory cell reset using dummy word lines in accordance with examples as disclosed herein.

FIG. 3 illustrates an example of a memory device 300 that supports techniques for memory cell reset using dummy word lines. The memory device 300 may be an example for implementing aspects of a system 100 or a memory die 200 as described with reference to FIGS. 1 and 2, respectively. For example, the memory device 300 may include one or more memory arrays 320, which may be examples of a memory array 170 or an array of memory cells 205 as described with reference to FIGS. 1 and 2, respectively. For instance, the memory device 300 may contain a memory array 320-a which may include one or more word lines 305, dummy word lines 310, and bit lines 315. In some cases, word lines 305 and dummy word lines 310 may be examples of the word lines 210 described with reference to FIG. 2 and may be referred to as rows, and bit lines 315 may be an example of digit lines 215 described with reference to FIG. 2 and may be referred to as digit lines or columns.

Word lines 305 may be coupled with a respective gate (e.g., a control gate) of one or more transistors 335 (e.g., switching components 235) of a respective row. Dummy word lines 310 may be coupled with a respective gate of one or more transistors 340 (e.g., switching components 235) of a respective row. For example, a word line 305-a may be coupled with the control gate of a transistor 335. The transistor 335 may have a first terminal coupled with a bit line 315-a and a second terminal coupled with a memory cell (e.g., a memory cell 205) of the memory array 320-a. The memory cell may include a storage node, such as a capacitive storage element. For example, the memory cell may be or include a capacitor 330 (e.g., a capacitor 230) that is coupled with the bit line 315-a through the transistor 335 based on a voltage of the word line 305-a and coupled with a voltage node 325 (e.g., a voltage node 240, Vpl, Vss). In some examples, the bit line 315-a may be coupled with a data input/output circuit (e.g., an input/output 255) associated with reading or writing data to the memory cell. Alternatively, the bit line 315-a may be coupled with a counter circuit configured to count a number of accesses of the word line 305-a (e.g., a row hammer counter circuit that supports the performance of row hammer refresh operations). For example, the memory array 320-a may include one or more bit lines 315 that are coupled with memory cells configured to store row access count information for the word lines 305, and the row access count information read using the one or more bit lines 315 may be output to the counter circuit.

Similarly, a dummy word line 310-a may be coupled with the control gate of a transistor 340. The transistor 340 coupled with the dummy word line 310-a, however, may have a first terminal coupled with a bit line 315-b and a second terminal coupled with a voltage node 345 (e.g., $V_O$). A voltage supplied to the voltage node 345 may be varied by the memory device 300. Each word line 305 may be coupled with multiple transistors 335 that are each coupled with a different bit line 315 and a different memory cell. Each dummy word line 310 may be coupled with multiple transistors 340 that are each coupled with a different bit line 315 and the voltage node 345. Each bit line 315 may be coupled with one or more transistors 335 and one or more transistors 340. For example, the bit line 315-a may be coupled with a set of transistors 335 that are each coupled between the bit line 315-a and a respective memory cell. The bit line 315-a may also be coupled with a set of transistors 340 that are coupled between the bit line 315-a and the voltage node 345. A set of word lines 305 may be coupled with the set of transistors 335, and a set of dummy word lines 310 may be coupled with the set of transistors 340. In the example of FIG. 3, each bit line 315 may be coupled with four transistors 340 and some quantity of transistors 335, with two transistors 340 at each edge of the memory array 320-a (although any quantity of transistors 340 may be coupled with each bit line 315).

The memory array 320-a may be coupled with a sense amplifier 350, which may be an example of a sense component 245 described with reference to FIG. 2, through the one or more bit lines 315. In some cases, more than one memory array 320, such as the memory array 320-a and a memory array 320-b, may be coupled with the same sense amplifier 350 through a first set of bit lines 315 (e.g., a DL_T set) and a second set of bit lines 315 (e.g., a DL_B set), respectively. In some examples, the memory array 320-a and the memory array 320-*b* may be considered a same memory array 320 having different subsets of control circuitry (e.g., bit lines 315, word lines 305, dummy word lines 310, transistors 335, transistors 340, etc.) used for accessing and resetting different subsets of memory cells, among other operations.

In some examples, the memory device 300 may count accesses at one or more word lines 310 of a memory array 320. In some cases, the memory device 300 may use the counter information for mitigation of row hammer attacks. For example, the memory device 300 may compare an access count corresponding to a given word line 310 with a threshold. If the access count exceeds the threshold, the memory device 300 may refresh memory cells coupled with one or more word lines 310 neighboring the word line 310 as part of a refresh operation for row hammer attack mitigation. In some examples, during a power up sequence of the memory device or following a refresh operation for row hammer attack mitigation, the memory device 300 may reset the counter information (e.g., reset one or more memory cells used to store the counter information) in order to support accurate row access counting and refresh operation performance for mitigating row hammer attacks.

In accordance with examples described herein, the memory device 300 may be operable (e.g., using the controller), as part of a reset operation, to reset one or more memory cells of memory arrays 320 by supplying a reset voltage (e.g., a zero, ground, low, or high voltage) supplied to the voltage node 345 to the one or more memory cells. To perform the reset operation, the memory device 300 may activate (e.g., using the controller) a dummy word line 310 of a memory array 320 to supply the reset voltage to one or more bit lines 315 (e.g., each bit line 315 of the memory array 320) through one or more respective transistors 340 to bias the one or more bit lines 315 to the reset voltage. In some cases, the memory device 300 may activate multiple dummy word lines 310 of the memory array 320 (e.g., two dummy word lines 310, four dummy word lines 310, or some other quantity of dummy word lines 310) during the reset operation to supply the reset voltage to the one or more bit lines 315. For example, activating multiple dummy word lines 310 to supply the reset voltage may ensure proper biasing of the one or more bit lines 315 to the reset voltage.

As part of the reset operation, the memory device 300 may additionally activate a word line 305 to supply the reset voltage, which has been supplied to the one or more bit lines 315, to one or more memory cells through one or more respective transistors 335 such that the one or more memory cells are reset. For example, the memory device 300 may activate the dummy word line 310-*a* to supply the reset voltage to one or more bit lines 315 of the memory array 320-*a* through one or more respective transistors 340 whose control gates are coupled with the dummy word line 310-*a*, thereby biasing the one or more bit lines 315 to the reset voltage. The memory device 300 may activate (e.g., after activating the dummy word line 310-*a*) a word line 305 of the memory array 320-*a* (e.g., the word line 305-*a*) to couple the one or more bit lines 315 to a respective memory cell (e.g., a capacitor 330 of the memory cell). Based on the one or more bit lines 315 being biased to the reset voltage, the one or more memory cells may be supplied with the reset voltage, such that the one or more memory cells are reset.

In some cases, the memory device 300 may sequentially activate one or more word lines 305 of a memory array 320 as part of the reset operation. For example, the memory device 300 may activate a first set of one or more word lines 305 (e.g., a first two word lines 305) at a first time during the reset operation and activate a second set of one or more word lines 305 (e.g., a second two word lines 305) at a second time during the reset operation that is after the first time. In some examples, while the first set and second set of word lines 305 may be activated at different times, the first set and second set of word lines 305 may be in an active state during overlapping time periods. For example, the first set of word lines 305 may be activated from the first time to a third time during the reset operation that is after the second time. In some examples, additional sets of word lines 305 may be sequentially activated, for example, until each word line 305 of the memory array 320 has been activated. In this way, the reset operation may reset the entire memory array 320. The first set and second set of word lines 305 (e.g., and the additional sets of word lines 305) may, in some cases, include different quantities of word lines 305. In some cases, sets of word lines 305 having increasing (e.g., exponentially increasing) quantities of word lines 305 may be sequentially activated for at least some of the time periods of word line activation. For example, a quantity in a set of word lines 305 that is activated at a particular time may be equal to a quantity of word lines 305 that have already been activated. Thus, quantities of word lines in each set may exponentially increase for at least some of the additional times in which sets of word lines are activated. Increasing quantities of word lines may reduce the amount of time that it takes to perform the reset operation, while the capacitance of the activated cells may assist in maintaining the reset voltage on the bit lines 315 during the reset operation.

The memory device 300 may perform the reset operation without activating the sense amplifier 350. That is, one or more components (e.g., transistors) of the sense amplifier 350 may be disabled during the reset operation, which may save power at the memory device 300. Such disabling may isolate the bit lines 315 from the sense amplifier 350 (e.g., a power supply associated with the sense amplifier) such that the sense amplifier 350 does not affect a voltage bias of the bit lines 315. As a result, the bit lines 315 may be biased to the reset voltage based on being coupled with the voltage node 345 using the dummy word lines 310. Additionally, in some examples, isolating the bit lines 315 from the sense amplifier 350 may isolate the memory array 320-*a* and the memory array 320-*b*, such that firing dummy word lines 310 of the memory array 320-*a* does not supply the voltage associated with the voltage node 345 to bit lines 315 of memory array 320-*b*, and vice versa.

In some cases, one or more dummy word lines 310 of the memory array 320-*b* (e.g., dummy word lines 310-*b*) may be defective. That is, the dummy word lines 310-*b* may be inoperable to couple respective bit lines 315 to the voltage node 345. This may occur, for example, due to manufacturing defects, which may be more prone to occur at edge components of a memory array such as the components coupled to the dummy word lines. In these cases, the memory device 300 may operate the sense amplifier 350 to couple (e.g., electrically connect) bit lines 315 of memory array 320-*a* with bit lines 315 of the memory array 320-*b* (e.g., while still isolating the bit lines 315 from the power supply associated with the sense amplifier 350). For example, because the dummy word lines 310-*b* are defective, in some cases, the bit lines 315 of the memory array 320-*b* may not be properly supplied with the reset voltage to reset the memory cells of the memory array 320-*b* (e.g., supplying the reset voltage using other working dummy word lines 310 may be insufficient to bias the bit lines 315 to the reset voltage). By coupling the bit lines 315 of the memory array 320-*a* with the bit lines of the memory array 320-*b*, the reset voltage may also be supplied to the bit lines 315 of the memory array 320-*b* through the bit lines of the memory array 320-*a*. Accordingly, activating dummy word lines 310 of memory array 320-*a* may help reset memory cells of memory array 320-*b* during a reset operation in the presence of defects in components of memory array 320-*b* by biasing the bit lines 315 of memory array 320-*b*.

In some examples, the memory device 300 may detect that one or more memory cells of a memory array 320, such as those associated with counter information for a row hammer mitigation procedure, failed to be reset during the reset operation. For example, the memory device 300 (e.g., or a component thereof) may trigger a flag when it detects that one or more memory cells was not reset as part of the reset operation and may perform another reset operation on the one or more memory cells (e.g., on the memory array 320). In cases where memory cells were attempted to be reset to a high voltage, the memory device 300 may perform a not-and operation (e.g., NAND) on read logic states of the memory cells, which may result in a high voltage output if any of the memory cells failed to be reset. Similarly, in cases where memory cells were attempted to be reset to a low voltage, the memory device 300 may perform a not-or operation (e.g., NOR) on read logic states of the memory cells, which may result in a low voltage output if any of the memory cells failed to be reset. The voltage outputs may be used by the memory device 300 to determine whether to perform another reset operation on the memory cells.

The memory device 300 may additionally be operable (e.g., using a controller associated with the memory device 300), as part of an access operation (e.g., a read operation, a write operation), to supply a precharge voltage to a bit line 315. For example, the voltage node 345 may be supplied with the precharge voltage, and activation of one or more dummy word lines 310 may supply the precharge voltage to the bit line 315. In some examples, the precharge voltage may be a reference voltage for the access operation. For example, a bit line 315 (e.g., DL_B) in memory array 320-*b* associated with a corresponding bit line 315 (e.g., DL_T) in memory array 320-*a* may be supplied with the precharge voltage by activating a dummy word line 310 of the memory array 320-*b*. The precharge voltage may be used as the reference voltage for an access operation of a memory cell coupled with the corresponding bit line 315 in memory array 320-*a*. In some examples, the dummy word lines 310 may instead be maintained (e.g., by the controller) at an inactive level (e.g., a ground or low voltage) during read or write operations.

Figure 4:
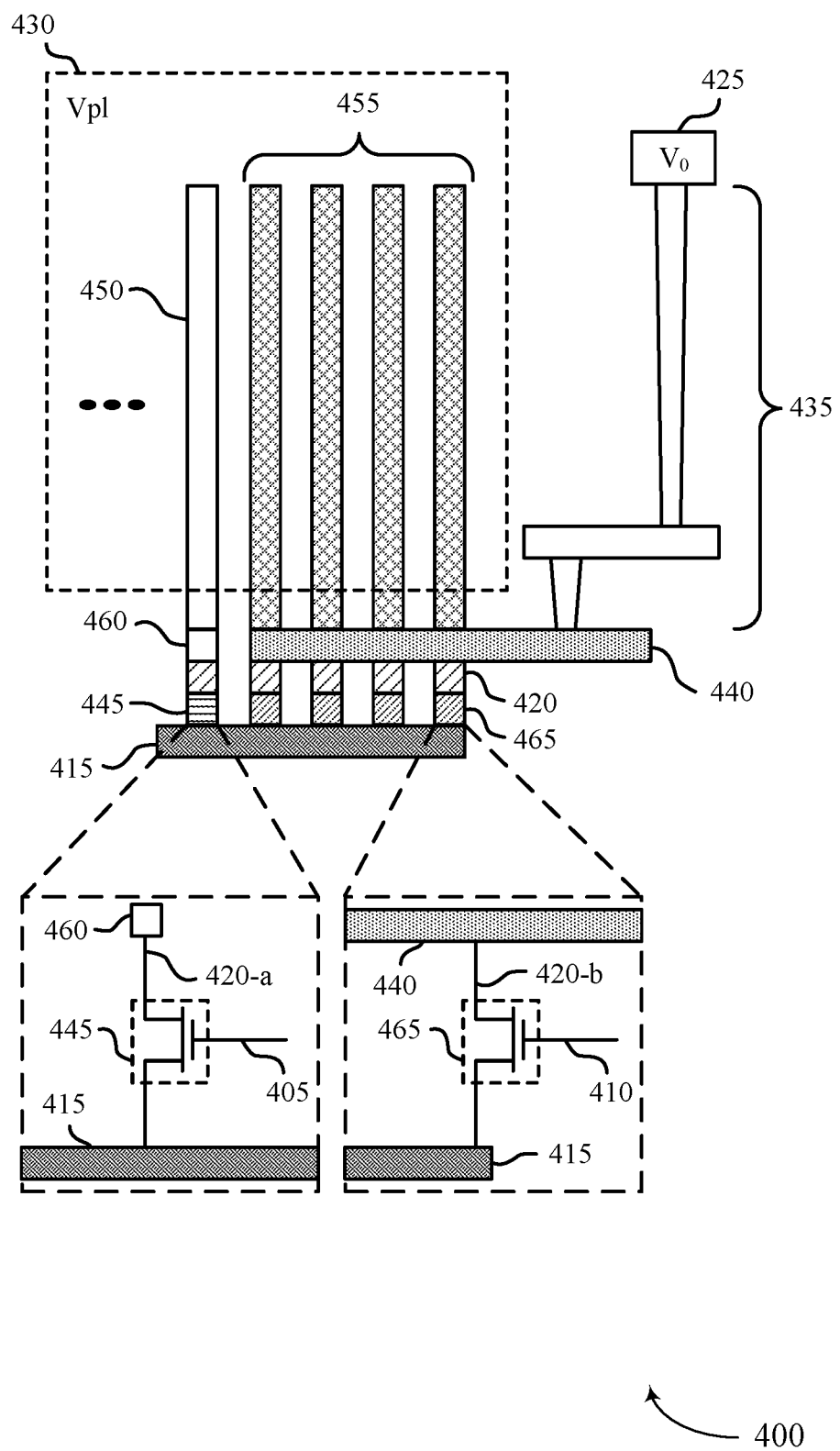
FIG. 4 illustrates an example of a memory device that supports techniques for memory cell reset using dummy word lines in accordance with examples as disclosed herein.

FIG. 4 illustrates an example of a memory device 400 that supports techniques for memory cell reset using dummy word lines. The memory device 400 may be an example for implementing aspects of a system 100, memory die 200, or memory device 300 as described with reference to FIGS. 1-3. For example, memory device 400 may contain one or more word lines 405, dummy word lines 410, and bit lines 415, which may be an example of corresponding components as described with reference to FIG. 3.

The memory device 400 may contain one or more transistors 445 (e.g., transistors 335) whose control gates are coupled with one or more word lines 405. The memory device 400 may also contain one or more transistors 465 (e.g., transistors 340) whose control gates are coupled with one or more dummy word lines 410. For example, a transistor 445 may have a control gate coupled with a word line 405. The transistor 445 may have a first terminal coupled with a memory cell 450 (e.g., through a connection 460, a line 420-*a*, or a combination thereof). The transistor 445 may also have a second terminal coupled with a bit line 415. Accordingly, activating (e.g., firing) the word line 405 may couple the bit line 415 with the memory cell 450, which may be used to write the memory cell 450 by applying a voltage to the bit line 415, or read the memory cell 450 by allowing the charge from memory cell 450 to transfer to bit line 415 for sensing by the sense amplifier.

A transistor 465 may have a control gate coupled with a dummy word line 410. The transistor 465 may have a first terminal coupled with a voltage node 425 (e.g., a voltage node 345), through a moat structure 440 (e.g., an MO moat), which may be a conductive line. In some examples, the first terminal of the transistor 465 may be coupled with the moat structure 440 through a line 420-*b*. The transistor 465 may also have a second terminal coupled with the bit line 415. The moat structure 440 may be coupled with the voltage node 425 through interconnect circuitry 435. In some examples, the moat structure 440 may be used to couple multiple transistors 465 to the voltage node 425. In the example of FIG. 4, the moat structure 440 may couple the first terminal of four transistors 465 to the voltage node 425. The moat structure 440 may short the first terminals of the transistors 465 such that memory cells 455, although present for uniformity of the array, are inoperable (e.g., non-functional, unused). For example, the memory cells 455 may be manufactured along with the dummy word lines 410 and other associated components (e.g., to reduce manufacturing defects associated with memory cells 450 near the edge of the memory array). However, because the moat structure 440 shorts the first terminals of the transistors 465 to the voltage node 425 rather than the memory cells 455, the memory cells 455 may be non-functional. In addition, the memory cells 455 may not be read or written to as part of read or write operations. For example, the memory cells 455 may not correspond to addressable memory cells of the memory array (e.g., the dummy word lines 410 may not be addressable by a host device). As such, word lines 410 may be referred to as "dummy" word lines 410 due to the similarity in structure of word lines 405, but the inability of the dummy word lines 410 to support accessing of the memory cells 455.

Instead, activating the dummy word line 410 may supply a voltage supplied to the voltage node 425 to the bit line 415 through the transistor 465, thereby biasing the bit line 415 to the voltage. In some examples, activating the dummy word line 410 may additionally supply the voltage to one or more other bit lines 415 corresponding to multiple columns of the memory device 400 through one or more other transistors 465 (e.g., as described with reference to FIG. 3).

In accordance with examples described herein, the memory device 400 may be operable (e.g., using a controller), as part of a reset operation, to reset one or more memory cells 450 by activating one or more dummy word lines 410 and word lines 405 corresponding to the one or more memory cells 450. In some cases, the memory cell 450 may be or include a capacitive storage element such as a capacitor that is coupled with a plate voltage 430. To reset the memory cell 450, the memory device 400 may activate one or more dummy word lines 410 to supply a reset voltage supplied to the voltage node 425 to the bit line 415. In some cases, the voltage may be a ground, low, or high voltage. Activating the one or more dummy word lines 410 may couple the moat structure 440 with the bit line 415 through the transistor 465, thereby supplying the reset voltage supplied to the voltage node 425 to the bit line 415. The memory device 400 may activate (e.g., after supplying the reset voltage to the bit line 415) one or more word lines 405, which may couple the bit line 415 with a respective memory cell 450 through a respective transistor 445. Accordingly, the reset voltage supplied to the voltage node 425 may be supplied from the bit line 415 to the memory cell 450 (e.g., to a capacitor of memory cell 450) through the transistor 445, such that the memory cell 450 is reset.

In some cases, a first set of one or more word lines 405 (e.g., a first two word lines 405 or some other quantity of word lines 405) may be activated at a first time during the reset operation, and a second set of one or more word lines 405 (e.g., a second two word lines 405, or some other quantity of word lines 405) may be activated at a second time during the reset operation after the first time. Multiple sets of one or more word lines 405 of the memory device 400 may be sequentially activated in time. By firing the dummy word lines 410 and one or more word lines 405, multiple memory cells 450 of the memory device 400 may be biased to the reset voltage.

Figure 5:
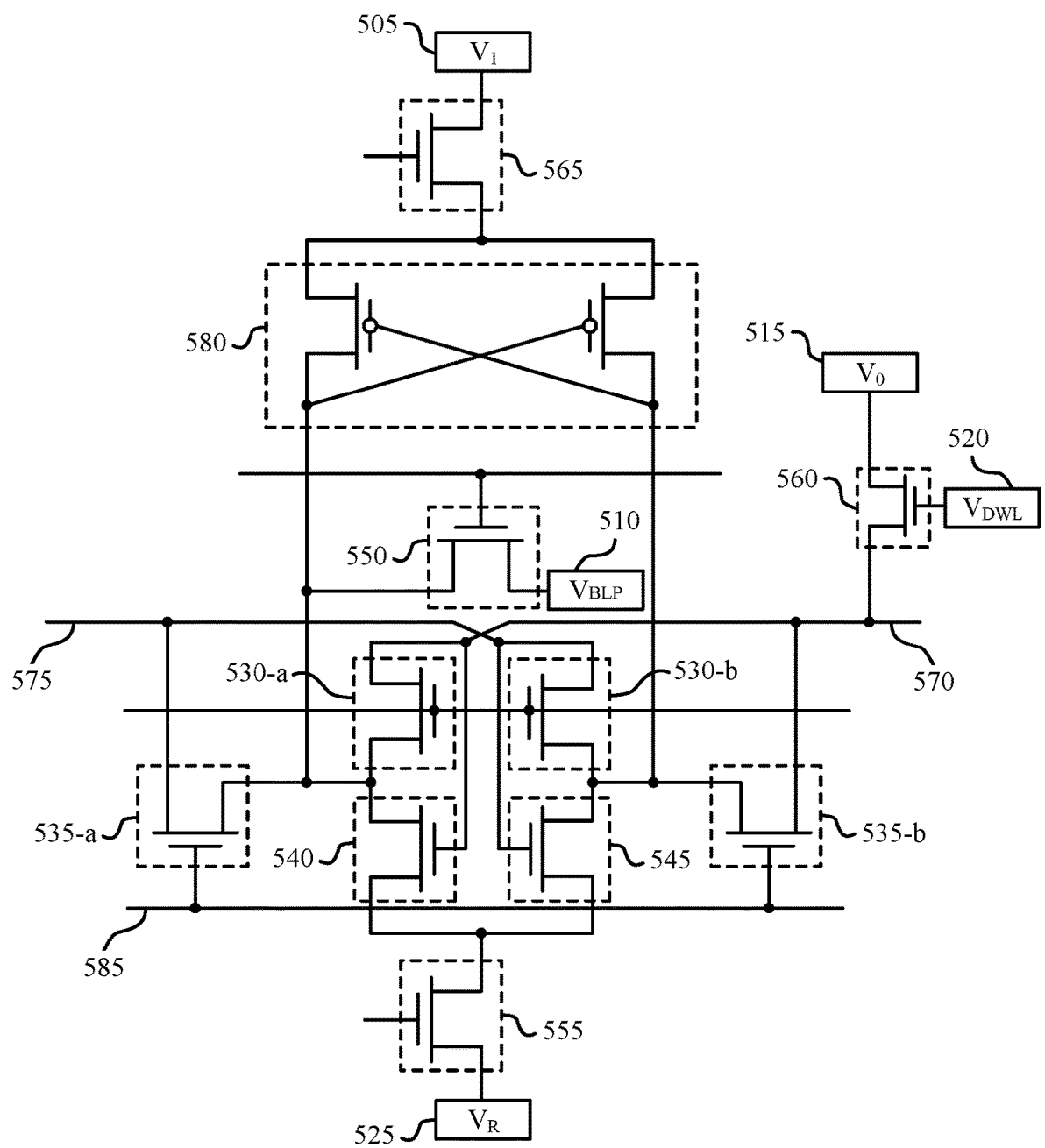
FIG. 5 illustrates an example of a sense amplifier that supports techniques for memory cell reset using dummy word lines in accordance with examples as disclosed herein.

FIG. 5 illustrates an example of a sense amplifier 500 that supports techniques for memory cell reset using dummy word lines. The sense amplifier 500 may implement aspects or be implemented by aspects of the system 100, the memory die 200, the memory device 300, and the memory device 400 as described with reference to FIGS. 1-4. For example, sense amplifier 500 be an example of a sense component 245 or a sense amplifier 350 as described with reference to FIGS. 2 and 3, respectively.

Sense amplifier 500 may be operable to convert (e.g., amplify) a signal resulting from accessing a memory cell during a read operation to determine a logic state of the memory cell. The sense amplifier 500 may also be operable to activate (e.g., bias) a bit line to write a logic state to a memory cell during a write operation, among other operations supported by the sense amplifier 500. The sense amplifier 500 may be coupled with (e.g., connected to) one or more bit lines (e.g., digit lines 215), such as a bit line 570 (e.g., DL_T) and a bit line 575 (e.g., DL_B). The sense amplifier 500 may include or be coupled with a voltage node 505 (e.g., $V_1$), a bit line precharge voltage 510 (e.g., $V_{BLP}$), a voltage node 525 (e.g., $V_R$), one or more transistors 530, 535, 540, 545, 550, and 555, a component 580, or a combination thereof. In some examples, a combination of the transistors 530, 535, 540, 550, and 555, and the component 580 may be activated or deactivated to isolate or couple the bit line 570 and the bit line 575 with voltage node 505, the bit line precharge voltage 510, the voltage node 525, or a combination thereof.

In some examples, a reset operation may include the use of one or more dummy word lines to drive (e.g., bias) a bit line, such as bit line 570, to a reset voltage (e.g., a ground voltage, a low voltage, a high voltage, Vss) supplied to a voltage node 515 (e.g., a voltage node 345, a voltage node 425) by varying a dummy word line voltage 520 (e.g., $V_{DWL}$). One or more dummy word lines (not shown) may similarly be used to drive the bit line 575 to the reset voltage. During the reset operation, the sense amplifier 500 may be disabled, for example, by disabling (e.g., deactivating) the transistor 555 and the transistor 565 by deactivating a driver coupled with control gates of the transistors 555 and 565. Additionally, the voltage node 505 and the voltage node 525 may be clamped at a voltage (e.g., VC2, GND). In some cases, the transistors 555 and 565 may be deactivated and the voltage nodes 505 and 525 may be isolated from the other components of the sense amplifier 500.

Additionally or alternatively, disabling the sense amplifier 500 may involve disabling one or more or transistors 530-*a* and 530-*b* (e.g., precharge control line (BLCP) transistors), transistors 535-*a* and 535-*b* (e.g., isolation (ISO) transistors), and transistor 550 (e.g., a bit line pair (BLPR) transistor). Transistors 535-*a* and 535-*b* may be disabled by setting the ISO signal 585 to an inactive state (e.g., GND, $V_0$). Disabling the sense amplifier 500 may isolate the bit line 570 and the bit line 575 from each other and from internal nodes of the sense amplifier 500. As a result, the bit line 570 and the bit line 575 may be independently biased to the reset voltage during a reset operation through respective transistors 560 (e.g., transistors 340, transistors 465). For example, a voltage bias of the bit line 570 and bit line 575 may be unaffected by the sense amplifier 500 based on being isolated from the sense amplifier 500. Additionally, disabling components of the sense amplifier 500 may contribute to power savings and reduced latency and complexity of the reset operation, among other benefits. For example, biasing a bit line to the reset voltage using dummy word lines includes the activation of the dummy word lines and supplying the voltage node 515 with the reset voltage, whereas biasing a bit line to the reset voltage using the sense amplifier 500 may include the activation and supplying of multiple transistors and voltage nodes, which may be associated with relatively increased power consumption, latency, and complexity.

In some cases, one or more dummy word lines of a memory device that includes the sense amplifier 500 may be defective (e.g., inoperable to couple bit lines with the voltage node 515 due to manufacturing defects) resulting in slower or erroneous reset operations at one or more memory cells. For example, one or more dummy word lines associated with biasing the bit line 575 may be defective. In these cases, the sense amplifier 500 may short the bit line 575 to the bit line 570 by enabling or disabling one or more components of the sense amplifier 500. For example, transistors 530-*a*, 530-*b*, 535-*a*, and 535-*b* may be enabled, while transistor 550 (e.g., a BLPR transistor) may be disabled. Accordingly, firing of the dummy word line associated with the bit line 570 may help to bias the bit line 575 to the reset voltage supplied by the voltage node 515. In these cases, sense amplifier 500 may still be disabled (e.g., transistors 555 and 555 may be off or disabled). Therefore, operation of the sense amplifier 500 in this manner may enable the resetting of memory cells associated with bit lines, such as bit line 575, coupled with defective dummy word lines while still providing power savings, reduced latency, and reduced complexity, among other benefits.

Figure 6:
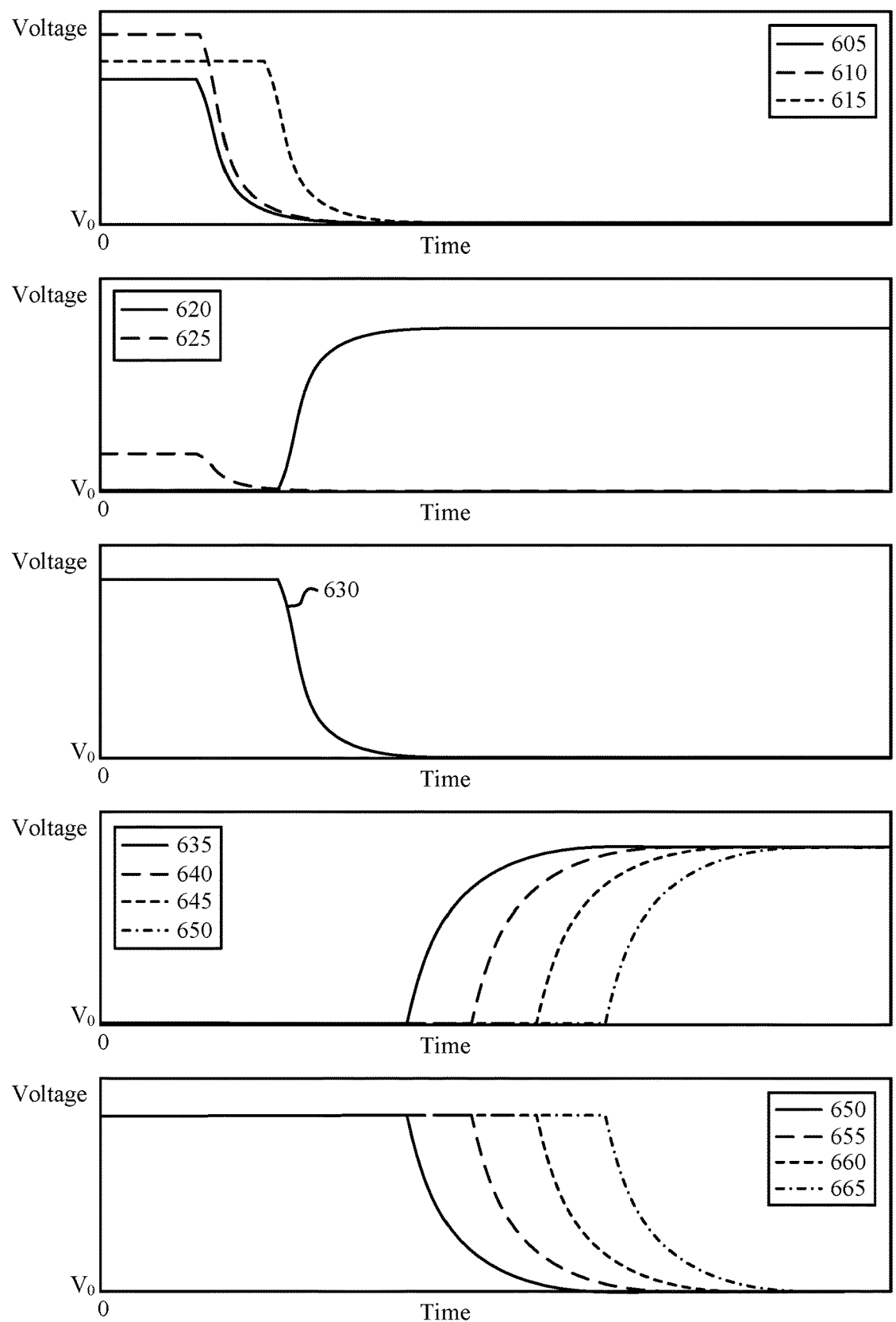
FIG. 6 illustrates an example of waveform diagrams that support techniques for memory cell reset using dummy word lines in accordance with examples as disclosed herein.

FIG. 6 illustrates an example of waveform diagrams 600 that support techniques for memory cell reset using dummy word lines. The waveform diagrams 600 may be implemented by aspects of a memory device as described with reference to FIGS. 1-5. For example, waveform diagrams 600 may illustrate voltages supplied to various components of the memory device described herein with reference to FIGS. 1-5 to support a reset operation of one or more memory cells of the memory device using dummy word lines. The waveform diagrams 600 are illustrative and may not be to scale. Waveform diagrams 600 reference a voltage $V_0$, which may be a ground voltage, low voltage, or any other voltage value.

The waveform diagrams 600 illustrate: a voltage 605 that may represent a first voltage supplied to a control gate of a first transistor (e.g., a transistor 550, a BLPR transistor) of a sense amplifier (e.g., sense component 245, sense amplifier 350, 500); a voltage 610 that may represent a second voltage supplied to control gates of one or more second transistors (e.g., a transistor 535, ISO transistors) of the sense amplifier; and a voltage 615 that may represent a third voltage supplied to control gates of one or more third transistors (e.g., a transistor 530, BLCP transistors) of the sense amplifier. As part of a reset operation, the memory device may drive (e.g., lower) voltages 605, 610, and 615 to $V_0$, for example, at the start of the reset operation. Accordingly, the first, second, and third transistors of the sense amplifier associated with the voltages 605, 610, and 615, respectively, may be disabled during the reset operation.

The waveform diagrams 600 also illustrate a voltage 620 that may represent a voltage of a dummy word line associated with the reset operation. For example, the dummy word line may be coupled with a control gate of a transistor (e.g., a transistor 340, 465, 560) that is coupled between a bit line and a voltage node (e.g., a voltage node 345, 425, 515). The waveform diagrams 600 also illustrate a voltage 625 that may represent a voltage supplied to the voltage node (e.g., a voltage supplied to a moat structure 440). As part of the reset operation, the memory device may drive the voltage 625 to a reset voltage (e.g., $V_0$) to be used for biasing the bit line (e.g., digit line) during the reset operation. After the voltage 625 is set to the reset voltage, the dummy word line may be activated. For example, the memory device may increase the voltage 620 to a voltage level (e.g., a high voltage) representing the activation (e.g., firing) of the dummy word line.

The waveform diagrams illustrate a voltage 630 that may represent a voltage supplied to the bit line. By activating the dummy word line, the voltage 625 of the voltage node may be supplied to the bit line through the transistor coupled between the voltage node and the bit line. Accordingly, the voltage 630 may drop to a voltage value corresponding to the voltage 625 (e.g., approximately the voltage 625).

The waveform diagrams further illustrate voltages 635, 640, 645, and 650 which may represent voltages supplied to a respective word line (e.g., although any quantity of voltages supplied to respective word lines may be supported). Following the biasing of the bit line to the reset voltage (e.g., the voltage 625), word lines associated with voltages 635, 640, 645, and 650 may be activated (e.g., fired) to supply the voltage 630 associated with the bit line to memory cells coupled with the respective word lines and the bit line. For example, the word lines associated with the voltages 635, 640, 645, and 650 may be each be coupled with a control gate of a transistor that is coupled between the bit line and a respective memory cell. The memory device may increase (e.g., sequentially in time) the voltages 635, 640, 645, and 650 to a voltage level (e.g., a high voltage) representing the activation (e.g., firing) of the word lines. As a result, the corresponding transistors may be activated and the voltage 630 of the bit line may be supplied to the respective memory cells such that the memory cells are reset. In some cases, voltages 635, 640, 645, and 650 may each correspond to a set of one or more word lines. For example, voltage 635 may represent voltages supplied to multiple word lines, which may be fired simultaneously. Each set of one or more word lines corresponding to the voltages 635, 640, 645, and 650 may contain a same quantity of word lines (e.g., two word lines), or one or more of the sets may include different quantities of word lines.

In some cases, the sets of one or more word lines associated with the voltages 635, 640, 645, and 650 may be activated in a staggered fashion in time, as illustrated. For example, the set of one or more word lines associated with voltage 635 may be activated at a first time, the set of one or more word lines associated with voltage 640 may be activated at a second time, the set of one or more word lines associated with voltage 645 may be activated at a third time, and so on. This process may be repeated for multiple sets of one or more word lines and is not limited to the illustrated example. In some examples, the activation of the sets of one or more word lines may be evenly spaced (e.g., a time between the sequential activations may be the same between each activation). Activating the sets of one or more word lines in the staggered fashion may be associated with word line driver (e.g., row decoder 220) constraints. For example, a word line driver of the memory device may support the simultaneous activation of a limited quantity of word lines. As such, the memory device may be unable to simultaneously activate each word line included in a memory array and may instead sequentially activate subsets of the word lines.

The waveform diagrams 600 illustrate voltages 650, 655, 660, and 665 that may each represent voltages of one or more memory cells (e.g., to one or more capacitors of the one or more memory cells) associated with the word lines. During the reset operation, the voltages 650, 655, 660, and 665 of the one or more memory cells may be biased to the voltage 630 associated with the bit line as word lines are activated to couple the bit line with the one or more memory cells (e.g., to a capacitor of the one or more memory cells). For example, as the one or more word lines associated with voltage 635 are activated, the one or more memory cells may be coupled with the bit line through corresponding transistors, such that voltage 650 associated with the one or more memory cells is set to the voltage 630 associated with the bit line (e.g., the reset voltage). Similarly, as the one or more word lines associated with voltages 640, 645, and 650 are activated, the voltages 655, 660, and 665 associated with corresponding memory cells may be set to the voltage 630 associated with the bit line, respectively. Accordingly, memory cells associated with voltages 650, 655, 660, and 665 may be reset. Such resetting may serve to reset count information associated with row hammer mitigation operations to ensure that proper and accurate row access counting is supported, reset the memory cells of a memory array in response to a power up sequence of the memory device, or both, among other operations.

Figure 7:
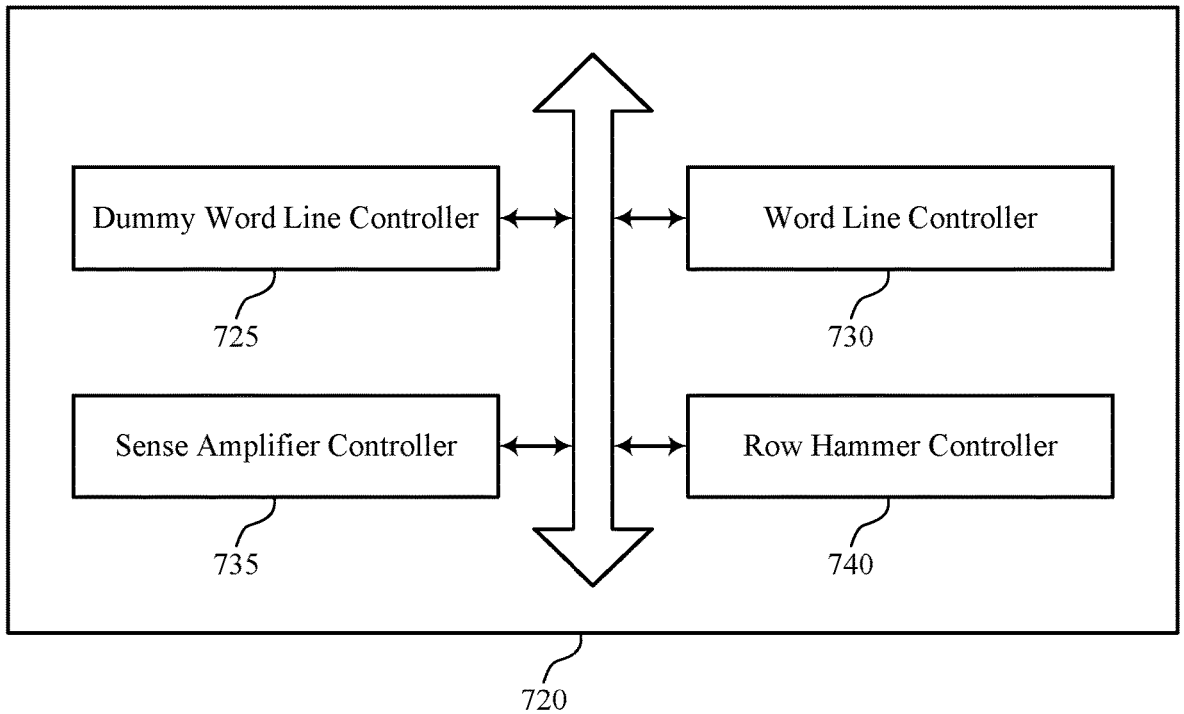
FIG. 7 shows a block diagram of a memory device that supports techniques for memory cell reset using dummy word lines in accordance with examples as disclosed herein.

FIG. 7 shows a block diagram 700 of a memory device 720 that supports techniques for memory cell reset using dummy word lines in accordance with examples as disclosed herein. The memory device 720 may be an example of aspects of a memory device as described with reference to FIGS. 1 through 6. The memory device 720, or various components thereof, may be an example of means for performing various aspects of techniques for memory cell reset using dummy word lines as described herein. For example, the memory device 720 may include a dummy word line controller 725, a word line controller 730, a sense amplifier controller 735, a row hammer controller 740, or any combination thereof. Each of these components may communicate, directly or indirectly, with one another (e.g., via one or more buses).

The dummy word line controller 725 may be configured as or otherwise support a means for activating, as part of a reset operation, a first word line coupled with a control gate of a first transistor that is coupled between a first bit line and a voltage node supplied with a first voltage, where the first voltage is supplied to the first bit line through the first transistor based at least in part on activating the first word line. The word line controller 730 may be configured as or otherwise support a means for activating, as part of the reset operation, a second word line coupled with a control gate of a second transistor that is coupled between the first bit line and a first memory cell, where the first voltage, which has been supplied to the first bit line, is supplied to the first memory cell such that the first memory cell is reset.

In some examples, the word line controller 730 may be configured as or otherwise support a means for activating, as part of the reset operation and after activating the second word line, a third word line coupled with a control gate of a third transistor that is coupled between the first bit line and a second memory cell, where the first voltage is supplied to the second memory cell through the third transistor such that the second memory cell is reset.

In some examples, the sense amplifier controller 735 may be configured as or otherwise support a means for deactivating, during the reset operation, one or more transistors of a sense amplifier to isolate the sense amplifier from the first bit line, where the first bit line is supplied with the first voltage based at least in part on the one or more transistors being deactivated during the reset operation.

In some examples, the sense amplifier controller 735 may be configured as or otherwise support a means for activating, as part of the reset operation, one or more transistors of a sense amplifier to short the first bit line with a second bit line, where the first memory cell is reset based at least in part on the first bit line and the second bit line being shorted.

In some examples, the first bit line and the second bit line are shorted based at least in part on a third word line coupled with a control gate of a third transistor that is coupled between the first bit line and the voltage node being inoperable to couple the first bit line with the voltage node.

In some examples, the dummy word line controller 725 may be configured as or otherwise support a means for activating, as part of an access operation, the first word line to couple the voltage node with the first bit line to supply the first bit line with a second voltage supplied to the voltage node, the second voltage corresponding to a precharge voltage associated with the access operation.

In some examples, the row hammer controller 740 may be configured as or otherwise support a means for detecting that one or more memory cells associated with a row hammer counter failed to be reset during the reset operation. In some examples, the dummy word line controller 725 may be configured as or otherwise support a means for activating the first word line based at least in part on the one or more memory cells failing to be reset. In some examples, the word line controller 730 may be configured as or otherwise support a means for activating the second word line, one or more additional word lines coupled with control gates of transistors coupled between the first bit line and respective memory cells, or a combination thereof, to reset the one or more memory cells that failed to be reset. In some examples, the first bit line is coupled with a counter circuit configured to count a number of accesses of the first word line.

In some examples, the word line controller 730 may be configured as or otherwise support a means for activating, as part of the reset operation, a third word line coupled with a control gate of a third transistor that is coupled between a second bit line and a second memory cell, where the first voltage is supplied to the second bit line through a fourth transistor coupled between the second bit line and the voltage node based at least in part on activating the first word line and is supplied to the second memory cell through the third transistor. In some examples, the second bit line is coupled with a data input/output circuit.

In some examples, the dummy word line controller 725 may be configured as or otherwise support a means for maintaining the first word line at an inactive level during each of a read operation for the first memory cell and a write operation for the first memory cell.

Figure 8:
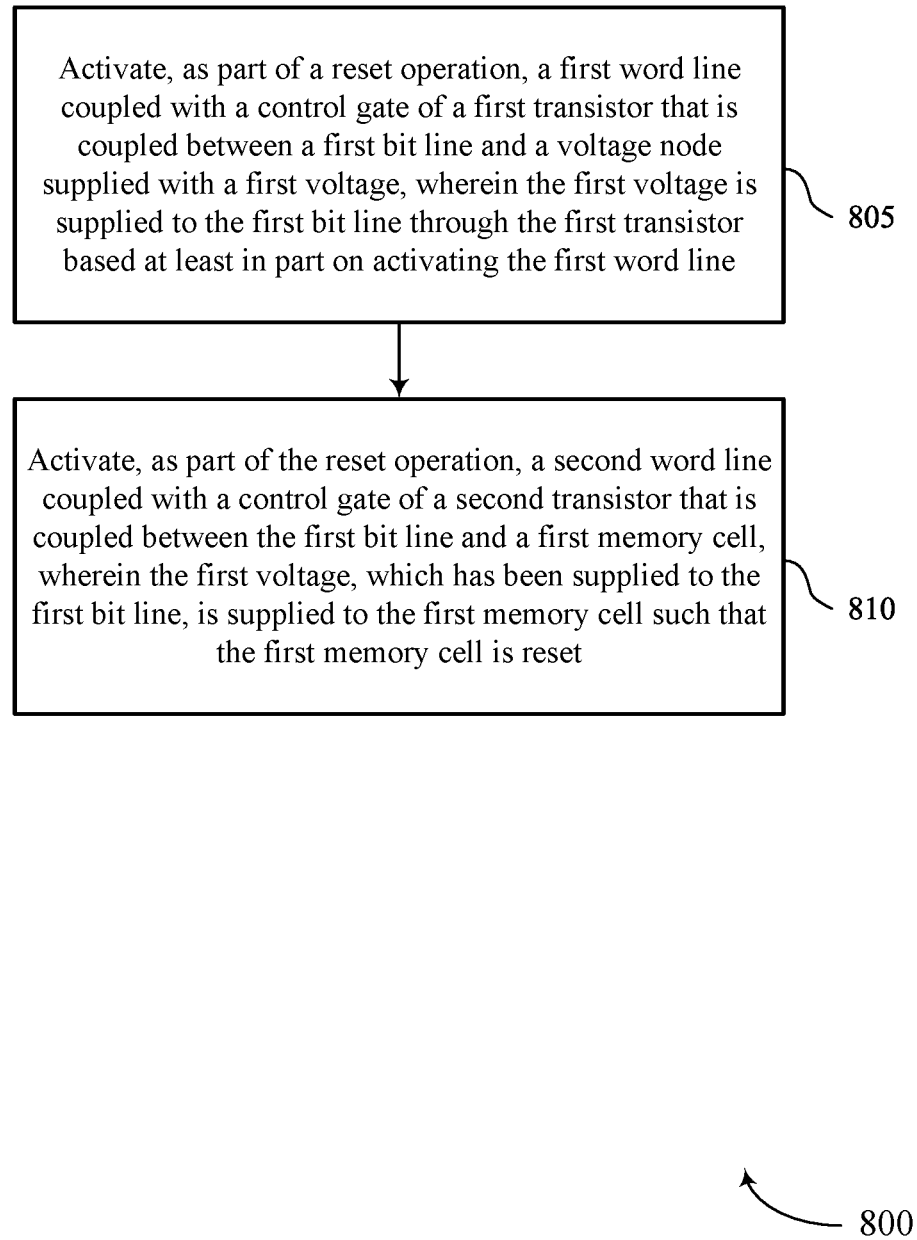
FIG. 8 shows a flowchart illustrating a method or methods that support techniques for memory cell reset using dummy word lines in accordance with examples as disclosed herein.

FIG. 8 shows a flowchart illustrating a method 800 that supports techniques for memory cell reset using dummy word lines in accordance with examples as disclosed herein. The operations of method 800 may be implemented by a memory device or its components as described herein. For example, the operations of method 800 may be performed by a memory device as described with reference to FIGS. 1 through 7. In some examples, a memory device may execute a set of instructions to control the functional elements of the device to perform the described functions. Additionally, or alternatively, the memory device may perform aspects of the described functions using special-purpose hardware.

At 805, the method may include activating, as part of a reset operation, a first word line coupled with a control gate of a first transistor that is coupled between a first bit line and a voltage node supplied with a first voltage, where the first voltage is supplied to the first bit line through the first transistor based at least in part on activating the first word line. The operations of 805 may be performed in accordance with examples as disclosed herein. In some examples, aspects of the operations of 805 may be performed by a dummy word line controller 725 as described with reference to FIG. 7.

At 810, the method may include activating, as part of the reset operation, a second word line coupled with a control gate of a second transistor that is coupled between the first bit line and a first memory cell, where the first voltage, which has been supplied to the first bit line, is supplied to the first memory cell such that the first memory cell is reset. The operations of 810 may be performed in accordance with examples as disclosed herein. In some examples, aspects of the operations of 810 may be performed by a word line controller 730 as described with reference to FIG. 7.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for activating, as part of a reset operation, a first word line coupled with a control gate of a first transistor that is coupled between a first bit line and a voltage node supplied with a first voltage, where the first voltage is supplied to the first bit line through the first transistor based at least in part on activating the first word line and activating, as part of the reset operation, a second word line coupled with a control gate of a second transistor that is coupled between the first bit line and a first memory cell, where the first voltage, which has been supplied to the first bit line, is supplied to the first memory cell such that the first memory cell is reset.

Aspect 2: The method, apparatus, or non-transitory computer-readable medium of aspect 1, further including operations, features, circuitry, logic, means, or instructions, or any combination thereof for activating, as part of the reset operation and after activating the second word line, a third word line coupled with a control gate of a third transistor that is coupled between the first bit line and a second memory cell, where the first voltage is supplied to the second memory cell through the third transistor such that the second memory cell is reset.

Aspect 3: The method, apparatus, or non-transitory computer-readable medium of any of aspects 1 through 2, further including operations, features, circuitry, logic, means, or instructions, or any combination thereof for deactivating, during the reset operation, one or more transistors of a sense amplifier to isolate the sense amplifier from the first bit line, where the first bit line is supplied with the first voltage based at least in part on the one or more transistors being deactivated during the reset operation.

Aspect 4: The method, apparatus, or non-transitory computer-readable medium of any of aspects 1 through 3, further including operations, features, circuitry, logic, means, or instructions, or any combination thereof for activating, as part of the reset operation, one or more transistors of a sense amplifier to short the first bit line with a second bit line, where the first memory cell is reset based at least in part on the first bit line and the second bit line being shorted.

Aspect 5: The method, apparatus, or non-transitory computer-readable medium of aspect 4 where the first bit line and the second bit line are shorted based at least in part on a third word line coupled with a control gate of a third transistor that is coupled between the first bit line and the voltage node being inoperable to couple the first bit line with the voltage node.

Aspect 6: The method, apparatus, or non-transitory computer-readable medium of any of aspects 1 through 5, further including operations, features, circuitry, logic, means, or instructions, or any combination thereof for activating, as part of an access operation, the first word line to couple the voltage node with the first bit line to supply the first bit line with a second voltage supplied to the voltage node, the second voltage corresponding to a precharge voltage associated with the access operation.

Aspect 7: The method, apparatus, or non-transitory computer-readable medium of any of aspects 1 through 6, further including operations, features, circuitry, logic, means, or instructions, or any combination thereof for detecting that one or more memory cells associated with a row hammer counter failed to be reset during the reset operation; activating the first word line based at least in part on the one or more memory cells failing to be reset; and activating the second word line, one or more additional word lines coupled with control gates of transistors coupled between the first bit line and respective memory cells, or a combination thereof, to reset the one or more memory cells that failed to be reset.

Aspect 8: The method, apparatus, or non-transitory computer-readable medium of any of aspects 1 through 7 where the first bit line is coupled with a counter circuit configured to count a number of accesses of the first word line.

Aspect 9: The method, apparatus, or non-transitory computer-readable medium of aspect 8, further including operations, features, circuitry, logic, means, or instructions, or any combination thereof for activating, as part of the reset operation, a third word line coupled with a control gate of a third transistor that is coupled between a second bit line and a second memory cell, where the first voltage is supplied to the second bit line through a fourth transistor coupled between the second bit line and the voltage node based at least in part on activating the first word line and is supplied to the second memory cell through the third transistor, and where the second bit line is coupled with a data input/output circuit.

Aspect 10: The method, apparatus, or non-transitory computer-readable medium of any of aspects 1 through 9, further including operations, features, circuitry, logic, means, or instructions, or any combination thereof for maintaining the first word line at an inactive level during each of a read operation for the first memory cell and a write operation for the first memory cell.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 11: An apparatus, including: a first bit line; a first transistor coupled between the first bit line and a first memory cell; a second transistor coupled between the first bit line and a voltage node supplied with a first voltage for a reset operation; a first word line coupled with a control gate of the first transistor; a second word line coupled with a control gate of the second transistor; and a controller, for the reset operation, configured to: activate the second word line to supply the first voltage to the first bit line through the second transistor; and activate the first word line to supply the first voltage, which has been supplied to the first bit line, to the first memory cell such that the first memory cell is reset.

Aspect 12: The apparatus of aspect 11, where the first bit line is coupled with a counter circuit configured to count a number of accesses of the first word line.

Aspect 13: The apparatus of aspect 12, further including: a third transistor coupled between a second bit line and a second memory cell, a control gate of the third transistor being coupled with the first word line, where the second bit line is coupled with a data input/output circuit.

Aspect 14: The apparatus of any of aspects 11 through 13, where the controller is configured to: maintain the second word line at an inactive level during each of a read operation for the first memory cell and a write operation for the first memory cell.

Aspect 15: The apparatus of any of aspects 11 through 14, further including: a third transistor coupled between the first bit line and a second memory cell; and a third word line coupled with a control gate of the third transistor, where the controller, for the reset operation, is configured to: activate, after activating the first word line, the third word line to supply the first voltage to the second memory cell through the third transistor such that the second memory cell is reset.

Aspect 16: The apparatus of any of aspects 11 through 15, further including: a sense amplifier coupled with the first bit line, where the controller, for the reset operation, is configured to: deactivate one or more transistors of the sense amplifier to isolate the sense amplifier from the first bit line, where the first bit line is supplied with the first voltage based at least in part on the one or more transistors being deactivated for the reset operation.

An apparatus is described. The following provides an overview of aspects of the apparatus as described herein:

Aspect 17: An apparatus, including: an array of memory cells; a first set of transistors each coupled between a first bit line and a respective memory cell of the array of memory cells; a second set of transistors each coupled between the first bit line and a voltage node supplied with a first voltage for a reset operation; a first set of word lines coupled with control gates of the first set of transistors; and a second set of word lines coupled with control gates of the second set of transistors, where, for the reset operation, the second set of word lines are operable to couple the voltage node with the first bit line to supply the first bit line with the first voltage, and where, for the reset operation, the first set of word lines are operable to couple the respective memory cells with the first bit line to reset the respective memory cells based at least in part on the first bit line being supplied with the first voltage.

Aspect 18: The apparatus of aspect 17, further including: a sense amplifier operable to couple with the first bit line, where, for the reset operation, one or more components of the sense amplifier are disabled, and where the first bit line is supplied with the first voltage based at least in part on the one or more components of the sense amplifier being disabled.

Aspect 19: The apparatus of aspect 18, where the one or more components of the sense amplifier that are disabled include one or more transistors operable to couple the sense amplifier with the first bit line, the sense amplifier isolated from the first bit line during the reset operation based at least in part on the one or more transistors being disabled.

Aspect 20: The apparatus of any of aspects 17 through 19, further including: a third set of transistors each coupled between a second bit line and a respective second memory cell of the array of memory cells; a fourth set of transistors each coupled between the second bit line and the voltage node; a third set of word lines coupled with control gates of the third set of transistors; and a fourth set of word lines coupled with control gates of the fourth set of transistors, where, for the reset operation, the fourth set of word lines are operable to couple the voltage node with the second bit line to supply the second bit line with the first voltage, and where, for the reset operation, the third set of word lines are operable to couple the respective second memory cells with the second bit line to reset the respective second memory cells based at least in part on the second bit line being supplied with the first voltage.

Aspect 21: The apparatus of aspect 20, further including: a sense amplifier coupled with the first bit line and the second bit line, where one or more transistors of the sense amplifier are disabled during the reset operation to isolate the first bit line from the second bit line.

Aspect 22: The apparatus of aspect 20, further including: a sense amplifier coupled with the first bit line and the second bit line, where the sense amplifier is operable to couple, as part of the reset operation, the first bit line and the second bit line, and where the respective second memory cells are reset based at least in part on the first bit line and the second bit line being coupled to each other.

Aspect 23: The apparatus of any of aspects 17 through 22, where: a first subset of word lines of the first set of word lines are operable to couple, at a first time during the reset operation, a first subset of memory cells to the first bit line to reset the first subset of memory cells; and a second subset of word lines of the first set of word lines are operable to couple, at a second time during the reset operation after the first time, a second subset of memory cells to the first bit line to reset the second subset of memory cells.

Aspect 24: The apparatus of aspect 23, where the first subset of word lines are activated from the first time to a third time during the reset operation, and the third time is after the second time.

Aspect 25: The apparatus of any of aspects 23 through 24, where the first subset of word lines and the second subset of word lines include different quantities of word lines.

Aspect 26: The apparatus of any of aspects 17 through 25, where the second set of word lines are operable to couple, for an access operation, the voltage node with the first bit line to supply the first bit line with a second voltage supplied to the voltage node, the second voltage corresponding to a precharge voltage associated with the access operation.

Aspect 27: The apparatus of any of aspects 17 through 26, where the first voltage supplied to the voltage node includes a ground voltage.

Aspect 28: The apparatus of any of aspects 17 through 27, where each memory cell of the array of memory cells includes a capacitive storage element.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor, access transistor, etc.) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:
1. An apparatus, comprising:
a first bit line;
a first transistor coupled between the first bit line and a first capacitive memory element;

a second transistor coupled between the first bit line and a voltage node supplied with a first voltage for a reset operation;
a first word line coupled with a first control gate of the first transistor;
a second word line coupled with a second control gate of the second transistor; and
a controller, for the reset operation, configured to:
  activate the second word line to supply the first voltage to the first bit line through the second transistor; and
  activate the first word line to supply the first voltage, which has been supplied to the first bit line, to the first capacitive memory element such that the first capacitive memory element is reset.

2. The apparatus of claim 1, wherein the first bit line is coupled with a counter circuit configured to count a number of accesses of the first word line.

3. The apparatus of claim 2, further comprising:
a third transistor coupled between a second bit line and a second capacitive memory element, a third control gate of the third transistor being coupled with the first word line, wherein the second bit line is coupled with a data input/output circuit.

4. The apparatus of claim 1, wherein the controller is configured to:
maintain the second word line at an inactive level during each of a read operation for the first capacitive memory element and a write operation for the first capacitive memory element.

5. The apparatus of claim 1, further comprising:
a sense amplifier coupled with the first bit line, wherein the controller, for the reset operation, is configured to:
  deactivate one or more transistors of the sense amplifier to isolate the sense amplifier from the first bit line, wherein the first bit line is supplied with the first voltage based at least in part on the one or more transistors being deactivated for the reset operation.

6. An apparatus, comprising:
an array of capacitive memory elements;
a first set of transistors each coupled between a first bit line and a respective capacitive memory element of the array of capacitive memory elements;
a second set of transistors each coupled between the first bit line and a voltage node supplied with a first voltage for a reset operation;
a first set of word lines coupled with first control gates of the first set of transistors; and
a second set of word lines coupled with second control gates of the second set of transistors, wherein, for the reset operation, the second set of word lines are operable to couple the voltage node with the first bit line to supply the first bit line with the first voltage,
wherein, for the reset operation, the first set of word lines are operable to couple the respective capacitive memory elements with the first bit line to reset the respective capacitive memory elements based at least in part on the first bit line being supplied with the first voltage.

7. The apparatus of claim 6, further comprising:
a sense amplifier operable to couple with the first bit line, wherein, for the reset operation, one or more components of the sense amplifier are disabled, and wherein the first bit line is supplied with the first voltage based at least in part on the one or more components of the sense amplifier being disabled.

8. The apparatus of claim 7, wherein the one or more components of the sense amplifier that are disabled comprise one or more transistors operable to couple the sense amplifier with the first bit line, the sense amplifier isolated from the first bit line during the reset operation based at least in part on the one or more transistors being disabled.

9. The apparatus of claim 6, further comprising:
a third set of transistors each coupled between a second bit line and a respective second capacitive memory element of the array of capacitive memory elements;
a fourth set of transistors each coupled between the second bit line and the voltage node;
a third set of word lines coupled with third control gates of the third set of transistors; and
a fourth set of word lines coupled with fourth control gates of the fourth set of transistors, wherein, for the reset operation, the fourth set of word lines are operable to couple the voltage node with the second bit line to supply the second bit line with the first voltage,
wherein, for the reset operation, the third set of word lines are operable to couple the respective second capacitive memory elements with the second bit line to reset the respective second capacitive memory elements based at least in part on the second bit line being supplied with the first voltage.

10. The apparatus of claim 9, further comprising:
a sense amplifier coupled with the first bit line and the second bit line, wherein one or more transistors of the sense amplifier are disabled during the reset operation to isolate the first bit line from the second bit line.

11. The apparatus of claim 9, further comprising:
a sense amplifier coupled with the first bit line and the second bit line,
wherein the sense amplifier is operable to couple, as part of the reset operation, the first bit line and the second bit line, and
wherein the respective second capacitive memory elements are reset based at least in part on the first bit line and the second bit line being coupled to each other.

12. The apparatus of claim 6, wherein:
a first subset of word lines of the first set of word lines are operable to couple, at a first time during the reset operation, a first subset of capacitive memory elements to the first bit line to reset the first subset of capacitive memory elements; and
a second subset of word lines of the first set of word lines are operable to couple, at a second time during the reset operation after the first time, a second subset of capacitive memory elements to the first bit line to reset the second subset of capacitive memory elements.

13. The apparatus of claim 12, wherein:
the first subset of word lines are activated from the first time to a third time during the reset operation, and
the third time is after the second time.

14. The apparatus of claim 12, wherein the first subset of word lines and the second subset of word lines include different quantities of word lines.

15. The apparatus of claim 6, wherein the second set of word lines are operable to couple, for an access operation, the voltage node with the first bit line to supply the first bit line with a second voltage supplied to the voltage node, the second voltage corresponding to a precharge voltage associated with the access operation.

16. The apparatus of claim 6, wherein the first voltage supplied to the voltage node comprises a ground voltage.

17. A method, comprising:
activating, as part of a reset operation, a first word line coupled with a first control gate of a first transistor that is coupled between a first bit line and a voltage node supplied with a first voltage, wherein the first voltage is supplied to the first bit line through the first transistor based at least in part on activating the first word line; and activating, as part of the reset operation, a second word line coupled with a second control gate of a second transistor that is coupled between the first bit line and a first capacitive memory element, wherein the first voltage, which has been supplied to the first bit line, is supplied to the first capacitive memory element such that the first capacitive memory element is reset.

18. The method of claim 17, further comprising:

activating, as part of the reset operation and after activating the second word line, a third word line coupled with a third control gate of a third transistor that is coupled between the first bit line and a second capacitive memory element, wherein the first voltage is supplied to the second capacitive memory element through the third transistor such that the second capacitive memory element is reset.

19. The method of claim 17, further comprising:

deactivating, during the reset operation, one or more transistors of a sense amplifier to isolate the sense amplifier from the first bit line, wherein the first bit line is supplied with the first voltage based at least in part on the one or more transistors being deactivated during the reset operation.

\* \* \* \* \*